United States Patent
Kiwan et al.

(10) Patent No.: US 11,162,451 B1
(45) Date of Patent: Nov. 2, 2021

(54) METHODS AND SYSTEMS FOR CONTROLLING FUEL INJECTOR HOLDING CURRENT

(71) Applicant: Ford Global Technologies, LLC, Dearborn, MI (US)

(72) Inventors: Rani Kiwan, Canton, MI (US); Ross Pursifull, Dearborn, MI (US); Joseph Thomas, Farmington Hills, MI (US); Paul Hollar, Belleville, MI (US); Ian D Campbell, Casco, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/209,014

(22) Filed: Mar. 22, 2021

(51) Int. Cl.
*F02D 41/40* (2006.01)

(52) U.S. Cl.
CPC .... *F02D 41/401* (2013.01); *F02D 2200/0618* (2013.01); *F02D 2200/101* (2013.01)

(58) Field of Classification Search
CPC ............ F02D 41/401; F02D 2200/101; F02D 2200/0618; F02D 2041/2055; F02D 41/20; F02D 2041/2058
See application file for complete search history.

(56) References Cited

U.S. PATENT DOCUMENTS

| | | | |
|---|---|---|---|
| 8,935,114 B2 | 1/2015 | Beer et al. | |
| 9,435,281 B2 | 9/2016 | Parrish et al. | |
| 9,494,100 B2 | 11/2016 | Rösel | |
| 2010/0108030 A1* | 5/2010 | Kusaka | F02D 41/20 123/357 |
| 2010/0176759 A1* | 7/2010 | North | F02M 53/06 318/473 |
| 2014/0092516 A1* | 4/2014 | Koch | H01F 7/1844 361/160 |
| 2016/0177855 A1* | 6/2016 | Kusakabe | F02D 41/20 123/490 |
| 2016/0237937 A1* | 8/2016 | Kusakabe | F02D 41/402 |
| 2018/0230923 A1* | 8/2018 | Tsukio | F02D 41/20 |
| 2019/0109534 A1* | 4/2019 | Okonogi | F02D 41/22 |
| 2020/0072153 A1* | 3/2020 | Inaba | F02D 41/20 |
| 2020/0088122 A1* | 3/2020 | Kusakabe | F02D 41/40 |
| 2020/0340418 A1* | 10/2020 | Iizuka | F02D 45/00 |

FOREIGN PATENT DOCUMENTS

DE 102016203191 A1 8/2017

OTHER PUBLICATIONS

Pursifull, R. et al., "Methods and Systems for Compensating for Fuel Injector Closing Time," U.S. Appl. No. 17/204,254, filed Mar. 17, 2021, 43 pages.
Pursifull, R. et al., "Methods and Systems for Improving Furl Injection Repeatability," U.S. Appl. No. 17/205,384, filed Mar. 18, 2021, 44 pages.

* cited by examiner

*Primary Examiner* — Joseph J Dallo
*Assistant Examiner* — Kurt Philip Liethen
(74) *Attorney, Agent, or Firm* — Geoffrey Brumbaugh; McCoy Russell LLP (57) ABSTRACT

Systems and methods for improving accuracy of an amount of fuel injected to an engine are disclosed. In one example, a maximum holding current of a fuel injector is adjusted so that a holding current of a fuel injector is equal to a predetermined value when the fuel injector is commanded to cease injecting fuel.

20 Claims, 5 Drawing Sheets

METHODS AND SYSTEMS FOR
CONTROLLING FUEL INJECTOR HOLDING
CURRENT

FIELD

The present description relates to a system and methods for improving accuracy of an amount of fuel that is injected to an engine via adjusting holding current of a fuel injector. The methods may be particularly useful for direct fuel injectors.

BACKGROUND AND SUMMARY

A fuel injector may inject fuel to an engine in response to electric signals that are delivered to drive circuitry of the fuel injector. The electric signals may transition from a low level to a high level to command the fuel injector fully open so that the fuel injector may deliver fuel. The electric signals may also transition from the high level to the low level to command the fuel injector fully closed so that the fuel injector may cease supplying fuel to the engine. However, different fuel injectors may respond differently to signals that are exactly the same due to manufacturing and material variation. Consequently, fuel injectors of a same type may inject different amounts of fuel when they are commanded via identical signals.

In one attempt to reduce variation in an amount of fuel that is injected by fuel injectors, a fuel injector transfer function may be modified according to an inductive artifact that may be present on a fuel injector signal. However, variation in an amount of fuel injected by the fuel injector may still occur. Therefore, it may be desirable to provide a way of further reducing variation of an amount of fuel injected.

The inventors herein have recognized the above-mentioned disadvantages and have developed a system, comprising: a fuel injector; and a controller including executable instructions stored in non-transitory memory that cause the controller to adjust a maximum fuel injector holding current to a value such that a holding current of the fuel injector is a predetermined value at a time when the fuel injector is commanded to cease delivering fuel, where the holding current is adjusted at a frequency.

By adjusting a maximum fuel injector holding current to a value such that a holding current of the fuel injector is a predetermined value at a time when the fuel injector is commanded to cease delivering fuel, it may be possible to reduce fuel delivery variation. Specifically, the maximum fuel injector holding current may be adjusted to a value that causes the fuel injector holding current to be a predetermined value when a fuel injector is commanded to cease flowing fuel so that variation in an amount of fuel injected may be reduced. For example, a fuel injector's holding current may be adjusted such that the fuel injector is at its minimum holding current when the fuel injector is commanded to cease injecting fuel. Each time the fuel injector injects fuel, the fuel injector may cease injecting fuel when the fuel injector's holding current is equal to the fuel injector's minimum holding current. Therefore, the amount of fuel injected by the fuel injector may be less likely to vary since an amount of fuel that a fuel injector injects may vary as the fuel injector's holding current varies when the fuel injector is commanded to cease injecting fuel.

The present description may provide several advantages. In particular, the approach may reduce variation of an amount of fuel injected via a fuel injector. Further, the approach may reduce the influence of nominal fuel injector operating conditions (e.g., temperature and battery voltage) on fuel injection variation. Further, the approach may be implemented with existing system hardware.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
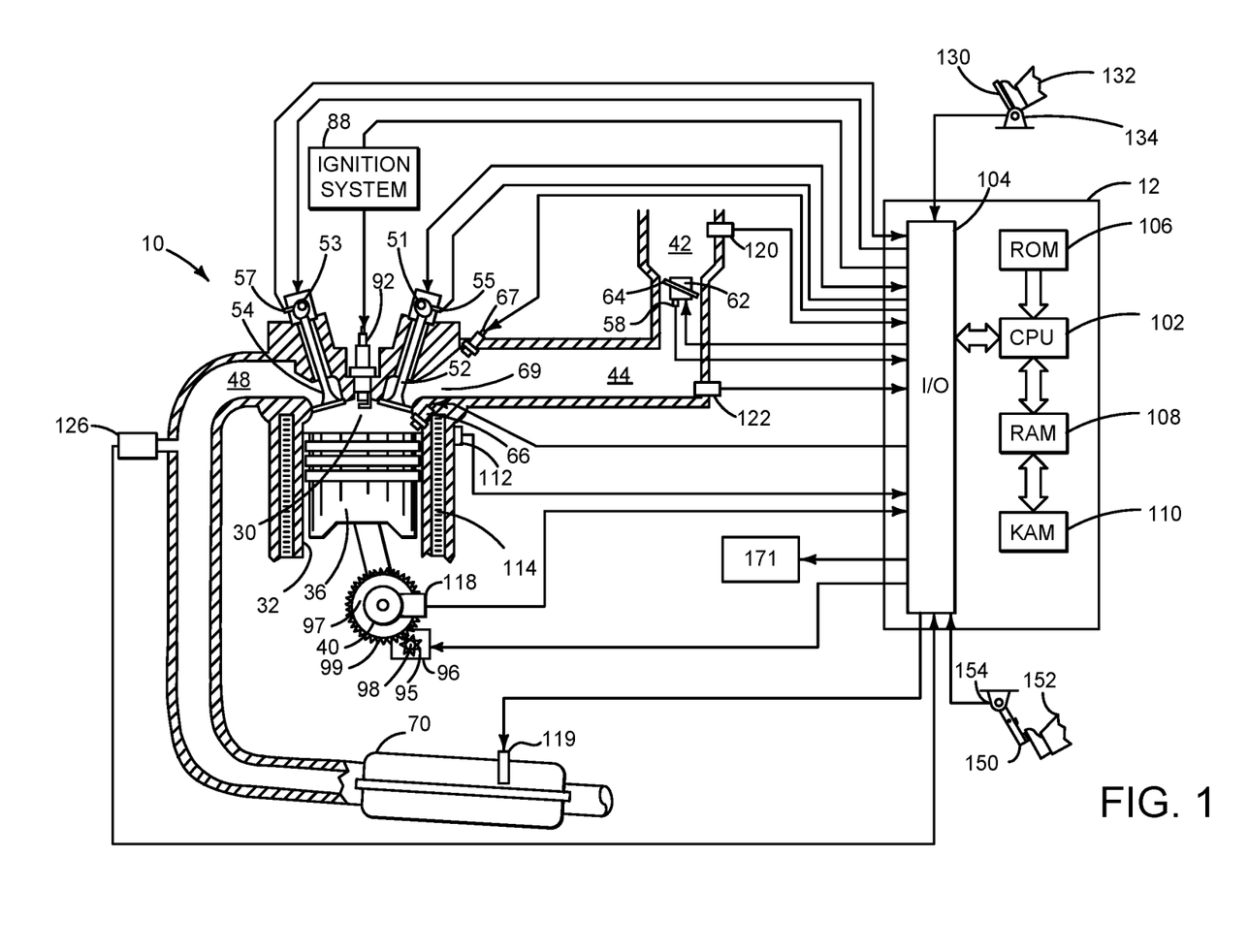
FIG. 1 is a schematic diagram of an engine.
Figure 2:
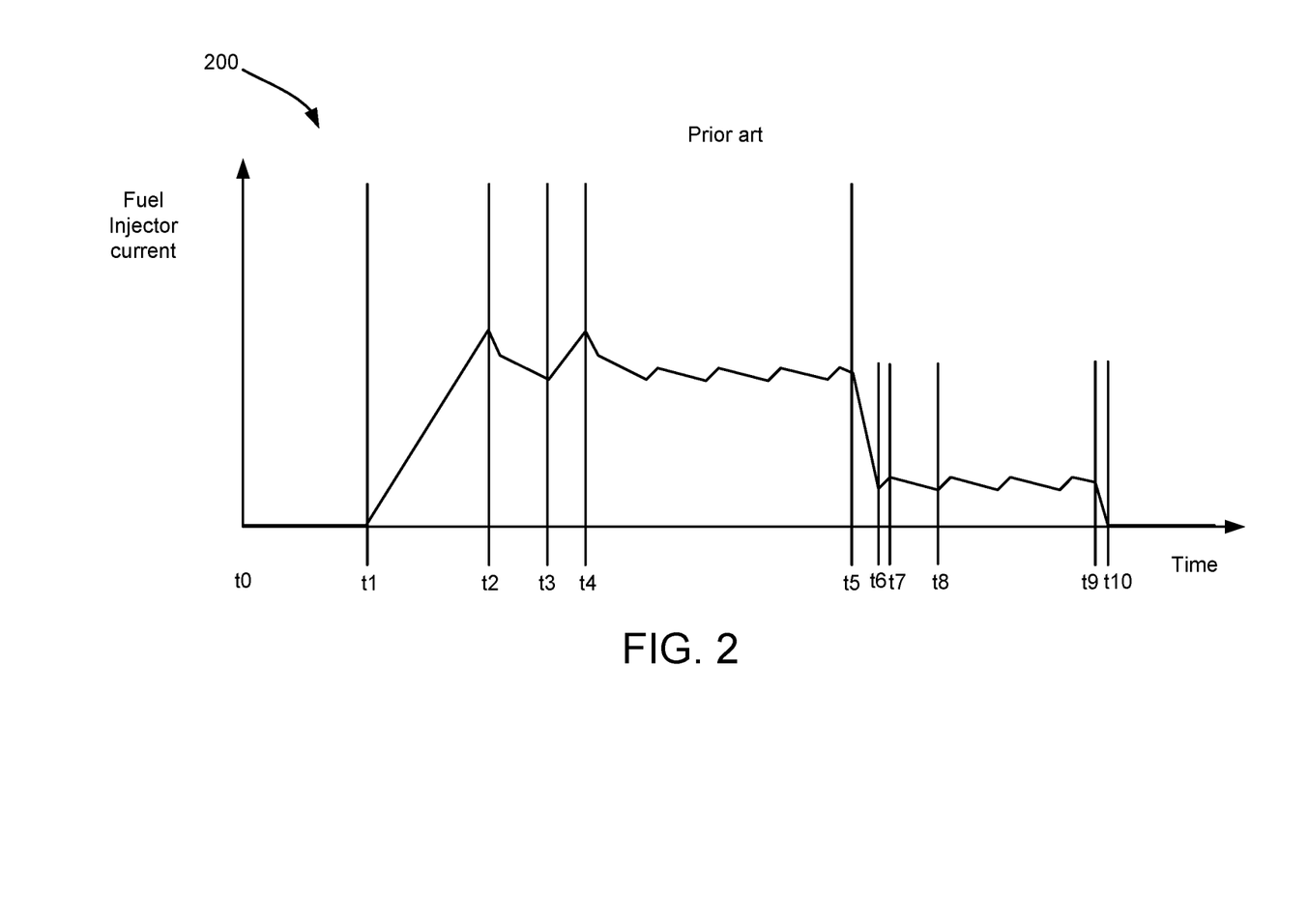
FIG. 2 shows electric current flowing through a fuel injector according to a prior art method.
Figure 3:
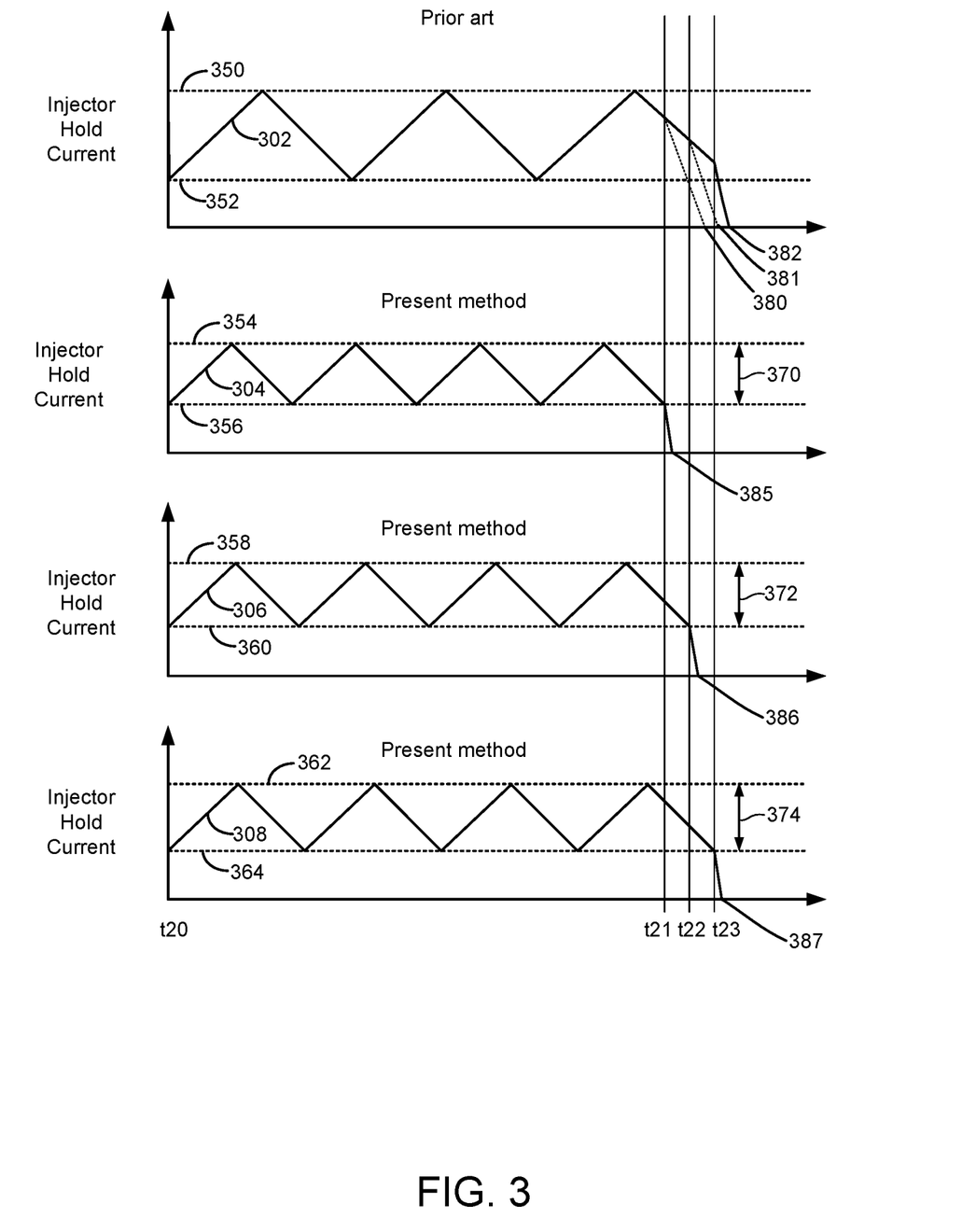
FIG. 3 shows how holding current of a fuel injector or injector holding current may be adjusted so that the holding current is equal to a predetermined value at a time when the fuel injector is commanded to cease delivering fuel even when a fuel injector pulse width is changed.
Figure 4:
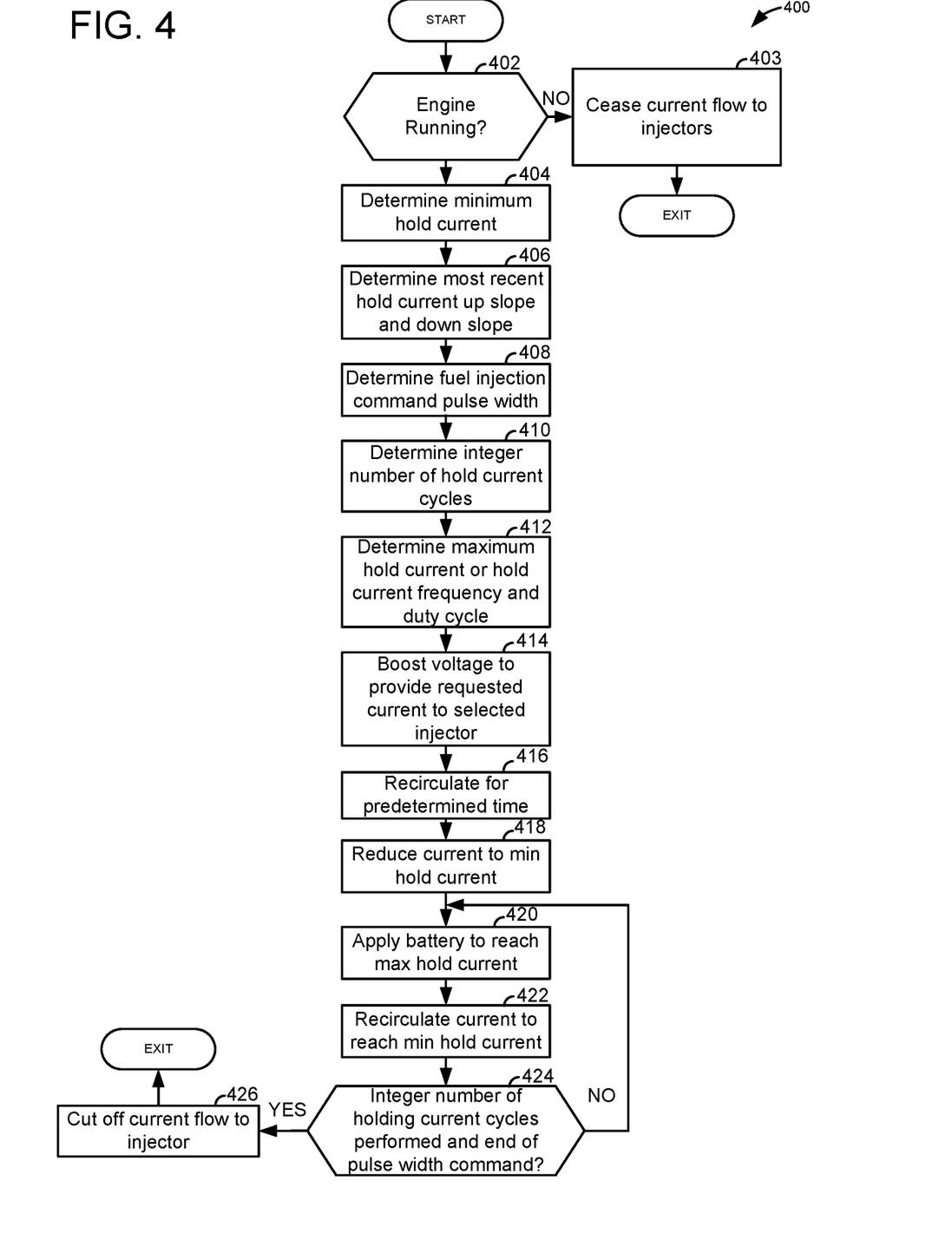
FIG. 4 shows a method for operating a fuel injector.
Figure 5:
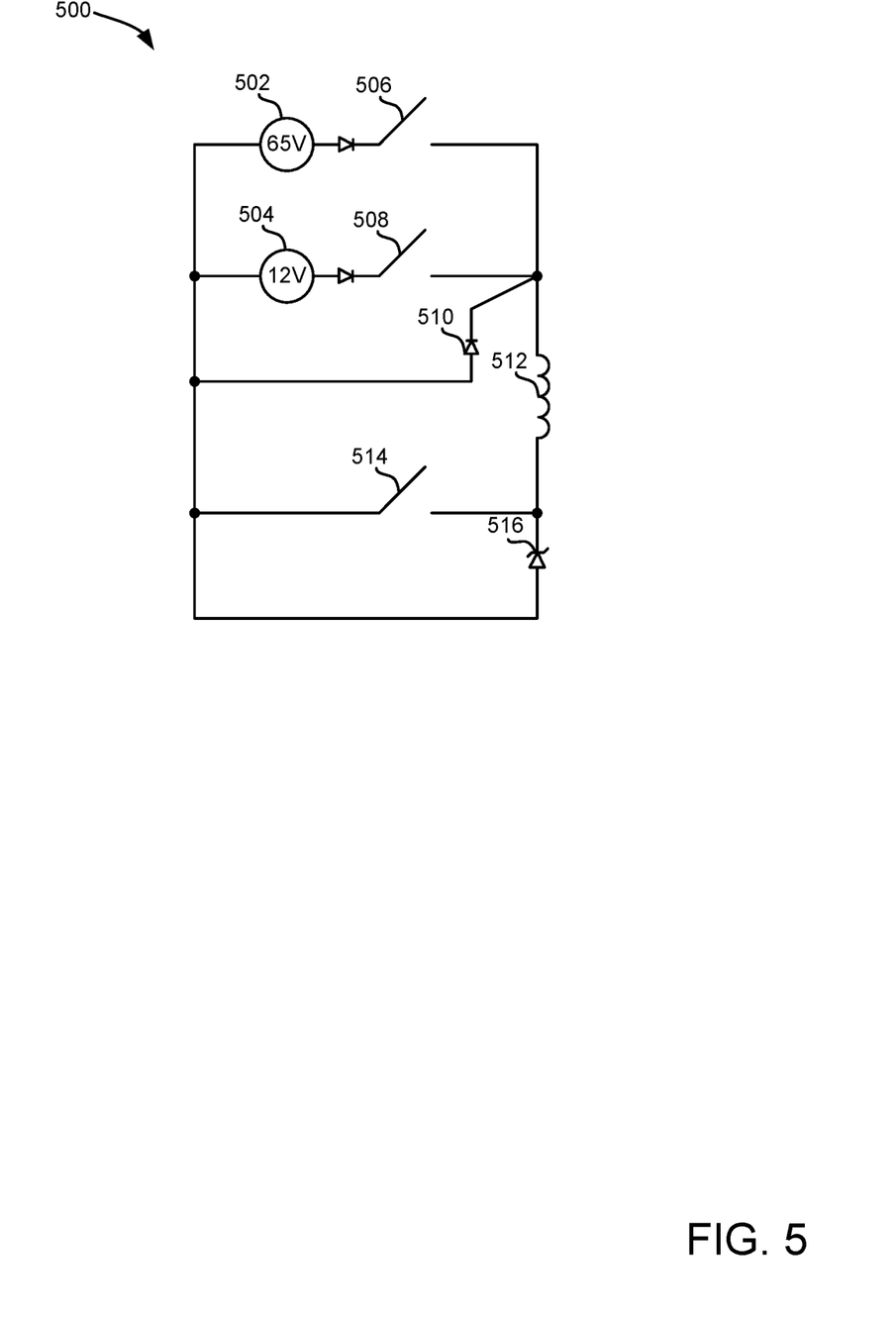
FIG. 5 shows an example circuit for operating a fuel injector.

The present description is related to reducing fuel injection variability. Fuel may be directly injected to engine cylinders via direct fuel injectors as shown in FIG. 1. A prior art electric current profile for a fuel injector is shown in FIG. 2. Several example plots of fuel injector holding current control according to the present system and method are shown in FIG. 3. A method for operating a fuel injector is shown in FIG. 4. The method of FIG. 4 may adjust a maximum fuel injector holding current so that fuel injector holding current is equal to a predetermined value when the fuel injector is commanded to cease injecting fuel. By ensuring that the fuel injector is at the predetermined holding current when the fuel injector is commanded to cease injecting fuel, it may be possible to reduce a variation in an amount of fuel injected by the fuel injector since an amount of energy that is extracted from the fuel injector allowing the fuel injector to close when the fuel injector is commanded to cease injecting fuel may be more consistent. A simplified circuit diagram for a direct fuel injector is shown in FIG. 5.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Direct fuel injector 66 is shown positioned to inject fuel directly into cylinder 30, which is known to those skilled in the art as direct injection. Port fuel injector 67, injects fuel to intake port 69, which is known to those skilled in the art as port injection. Fuel injector 66 delivers liquid fuel in proportion to a voltage pulse width or fuel injector pulse width of a signal from controller 12. Likewise, fuel injector 67 delivers liquid fuel in proportion to a voltage pulse width or fuel injector pulse width from controller 12. Fuel is delivered to fuel injectors 66 and 67 by a fuel system (not shown) including a fuel tank, fuel pump, and fuel rail (not shown). Fuel is supplied to direct fuel injector 66 at a higher pressure than fuel is supplied to port fuel injector 67. In addition, intake manifold 44 is shown communicating with optional electronic throttle 62 which adjusts a position of throttle plate 64 to control air flow from air intake 42 to intake manifold 44. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a propulsive effort pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. Further, in some examples, other engine configurations may be employed, for example a diesel engine with multiple fuel injectors. Further, controller 12 may receive input and communicate conditions such as degradation of components to light, or alternatively, human/machine interface 171.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Thus, the system of FIG. 1 provides for a system, comprising: a fuel injector; and a controller including executable instructions stored in non-transitory memory that cause the controller to adjust a maximum fuel injector holding current to a value such that a holding current of the fuel injector is a predetermined value at a time when the fuel injector is commanded to cease delivering fuel, where the holding current is adjusted at a frequency. The system includes where the value is a minimum holding current threshold value. The system includes where the value is based on a value of an up-slope of the holding current. The system includes where the value is further based on a down-slope of the holding current. The system includes where the value is further based on a minimum fuel injector holding current. The system includes where the fuel injector is commanded to cease delivering fuel based on a requested fuel pulse width, and where the requested fuel pulse width is based on engine speed and load. The system further comprises additional instructions to adjust the holding current of the fuel injector to cycle for a predetermined integer number of times during a single fuel injection.

The system of FIG. 1 also provides for a system, comprising: a fuel injector; a battery high side switch and a low side switch; and a controller including executable instructions stored in non-transitory memory that cause the controller to adjust a holding current of the fuel injector to vary in time and end at a predetermined value at a time when the fuel injector is commanded to cease flowing fuel. The system includes where the holding current ends and fuel injection is commanded to cease flowing fuel via opening the low side switch and opening the battery high side switch.

The system further comprises additional instructions to adjust the holding current in response to a maximum holding current threshold that is based on an upward slope of the holding current and a downward slope of the holding current. The system further comprises additional instructions to adjust the holding current in response to a period and a duty cycle.

Referring now to FIG. 2, an electric current profile for a fuel injector is shown. The electric current profile shows electric current flow into a fuel injector while fuel is being injected via the fuel injector. The fuel injector may be a direct fuel injector 66 as shown in FIG. 1. The references to the low side switch, boost high side switch, and the battery high side switch mentioned in the description of FIG. 2 refer to the switches that are shown in FIG. 5.

Plot 200 shows a plot of fuel injector current amount versus time. The vertical axis represents an amount of electric current flowing into a fuel injector and the amount of electric current increases in the direction of the vertical axis arrow. The horizontal axis represents time and time increases from the left side of the plot to the right side of the plot.

At time t0, the amount of electric current flowing into the fuel injector is zero. The fuel injector is fully closed (not shown) and fuel is not flowing through the fuel injector.

At time t1, the fuel injector is commanded to open and a boosted voltage (e.g., 65 volts DC) is applied to the fuel injector (not shown) by closing the boost high side switch. Applying the boosted voltage causes electric current to begin to flow into the fuel injector. This may be referred to as a first boost phase or simply a boost phase during the fuel injection period. Time t1 is also the beginning of the fuel injection period, or the beginning of a time period in which fuel is injected via the fuel injector. The fuel injection period may be a function of a requested amount of fuel to inject to an engine cylinder via a fuel injector. During the boost phase, the battery high side switch and the low side switch are also closed to allow electric current to flow into the fuel injector (not shown).

At time t2, the amount of electric current flowing into the fuel injector reaches a threshold. Therefore, the boost phase is ended so as to allow the amount of electric current flowing into the fuel injector to be reduced. The boost phase is ended by opening the boost high side switch and leaving the battery high side switch closed (not shown). The low side switch also remains closed (not shown).

At time t3, the boosted voltage is applied to the fuel injector a second time, although this application of the boost voltage is optional. The boost high side switch is closed so that the electric current flowing into the fuel injector begins to increase. The battery high side switch and the low side switch remain closed.

At time t4, the amount of electric current flowing into the fuel injector reaches the threshold again. Therefore, the boost phase is ended so as to allow the amount of electric current flowing into the fuel injector to be reduced. The boost phase is ended by opening the boost high side switch and leaving the battery high side switch closed (not shown). The low side switch also remains closed (not shown). The pick-up or recirculation mode begins. In between time t4 and time t5, the battery high side switch may be repeatedly opened and closed. The battery high side switch may be opened if the fuel injector current is not less than a threshold and the battery high side switch may be closed if the fuel injector current is reduced to the threshold. The battery high side switch may remain closed until the fuel injector current exceeds a second threshold current. These actions cause the fuel injector to open without drawing large amounts of electric current.

At time t5, which may be a predetermined amount of time since time t1, the fuel injector is open and the low side switch is opened so that the amount of energy stored in the fuel injector's coil may be reduced via allowing current to flow through a freewheeling diode. The battery high side switch is closed and the boost high side switch is closed. As a result, the amount of electric current that is flowing into the fuel injector may be quickly reduced.

At time t6, the electric current flowing into the fuel injector is reduced to a minimum holding current. The holding phase begins and the freewheeling phase ends at time t6. The low side switch is closed and the battery high side switch is closed so that the amount of electric current flowing into the fuel injector begins to increase toward a maximum holding current. By operating the fuel injector with an electric current that is between the maximum holding current and the minimum holding current, the fuel injector may remain in an open state while consuming little electric energy. While the fuel injector is operated in the holding phase (e.g., between time t6 and commanding the fuel injector to cease injecting fuel at time t9), the amount of electric current flowing through the fuel injector is cycled between a minimum holding current and a maximum holding current. The amount of holding current is cycled from the minimum holding current to the maximum holding current by closing the battery high side switch when the electric current flowing through the fuel injector is less than or equal to the minimum holding current and opening the battery high side switch when the electric current flowing through the fuel injector is equal to or greater than the maximum holding current. The minimum holding current and the maximum holding current are held at constant values during the holding phase. A period (e.g., a saw-tooth period) in which the fuel injector holding current is cycled from the minimum holding current to the maximum holding current is indicated as the amount of time between time t6 and time t8. The fuel injector holding current ramp-up period for the fuel injector period between time t6 and t8 is from time t6 to time t7. The fuel injector holding current ramp-down period for the fuel injector period between time t6 and t8 is from time t7 to time t8. In this example, the total period is an amount of time between a first time when the fuel injector is at a minimum holding current and a second time when the fuel injector is at minimum holding current after the fuel injector is supplied with the maximum holding current after the first time and before the second time.

At time t9, the fuel injector is commanded to cease injecting fuel such that the fuel injector is off or closed. The holding phase is ended when the fuel injector is commanded to cease injecting fuel or off. The fuel injector is commanded to cease injecting fuel or off by opening the low side switch when the battery high side switch and the boost high side switch are open. Energy that is stored in the fuel injector is reduced to zero and current flow through the fuel injector is zero at time t10. Time t10 is also the end of the fuel injection period. The energy that is stored in the fuel injector is dissipated by allowing electric current to flow through a freewheeling diode (as shown in FIG. 5) between time t9 and time t10.

Referring now to FIG. 3, plots that illustrate holding current control for fuel injectors according to the prior art and according to the present method are shown. The plots show how holding current may be controlled during a holding phase of fuel injection once the fuel injector is in an open state. The plots of FIG. 3 are aligned in time.

The first plot from the top of FIG. 3 shows a plot of fuel injector holding current according to the prior art. The vertical axis represents fuel injector holding current and holding current increases in the direction of the vertical axis arrow. The horizontal axis represents time and time increases from the left side of the figure to the right side of the figure. Line 302 represents fuel injector holding current according to a prior art method. Dashed line 350 represents a maximum fuel injector holding current threshold and dashed line 352 represents a minimum fuel injector holding current threshold.

The second plot from the top of FIG. 3 shows a plot of fuel injector holding current when fuel injection is commanded to be ceased at time t21 according to the present method described herein. The vertical axis represents fuel injector holding current and fuel injector holding current increases in the direction of the vertical axis arrow. The horizontal axis represents time and time increases from the left side of the figure to the right side of the figure. Line 304 represents fuel injector holding current according to a present method. Dashed line 354 represents a maximum fuel injector holding current threshold and dashed line 356 represents a minimum fuel injector holding current threshold.

The third plot from the top of FIG. 3 shows a plot of fuel injector holding current when fuel injection is commanded to be ceased at time t22 according to the present method described herein. The vertical axis represents fuel injector holding current and fuel injector holding current increases in the direction of the vertical axis arrow. The horizontal axis represents time and time increases from the left side of the figure to the right side of the figure. Line 306 represents fuel injector holding current according to a present method. Dashed line 358 represents a maximum fuel injector holding current threshold and dashed line 360 represents a minimum fuel injector holding current threshold.

The fourth plot from the top of FIG. 3 shows a plot of fuel injector holding current when fuel injection is commanded to be ceased at time t23 according to the present method described herein. The vertical axis represents fuel injector holding current and fuel injector holding current increases in the direction of the vertical axis arrow. The horizontal axis represents time and time increases from the left side of the figure to the right side of the figure. Line 308 represents fuel injector holding current according to a present method. Dashed line 362 represents a maximum fuel injector holding current threshold and dashed line 364 represents a minimum fuel injector holding current threshold.

At time t20, the fuel injector holding current according to the prior art method is at a minimum fuel injector holding current and the battery high side switch and the boost high side switch are open while the low side switch is closed (not shown) as indicated in the first plot from the top of FIG. 3. Likewise, the holding current according to the present method when the fuel injector is commanded to cease injecting fuel at time t21 (second plot from the top of FIG. 3) is at the minimum fuel injector holding current at time t20. In addition, the holding current according to the present method when the fuel injector is commanded to cease injecting fuel at time t22 (third plot from the top of FIG. 3) is at the minimum fuel injector holding current at time t20. Further, the holding current according to the present method when the fuel injector is commanded to cease injecting fuel at time t23 (fourth plot from the top of FIG. 3) is at the minimum fuel injector holding current at time t20.

In this example, the maximum fuel injector holding currents for when the fuel injector is commanded to cease injecting fuel at time t21 (the second plot from the top of FIG. 3) is adjusted to a lower level as compared to the maximum fuel injector holding current level shown for the prior art method (the first plot from the top of FIG. 3). By reducing the maximum fuel injector holding current level, it may take less time for the fuel injector holding current to be reduced from the maximum fuel injector holding current level to the minimum fuel injector holding current level. In addition, reducing the maximum fuel injector holding current level may increase the frequency of the holding current, thereby reducing the period of the fuel injector holding current so that the fuel injector holding current may be equal to the minimum fuel injector holding current at time t21. The difference between the maximum holding current 354 and the minimum holding current 356 for when the fuel injector is commanded to cease fuel injection at time t21 is indicated by arrow 370.

The maximum fuel injector holding currents for when the fuel injector is commanded to cease injecting fuel at time t22 (the third plot from the top of FIG. 3) is adjusted to a level that is higher than the maximum fuel injector holding current when the fuel injector is commanded to cease fuel injection at time t21 (354 as shown in the second plot from the top of FIG. 3) and less than the maximum fuel injector holding current according to the prior art method (350 as shown in the first plot from the top of FIG. 3). By adjusting the maximum fuel injector holding current level, an amount of time it takes fuel injector holding current to be reduced from the level of maximum fuel injector holding current level 358 to the minimum fuel injector holding current level 360 may be increased as compared to the amount of time it takes to reduce the fuel injector holding current from maximum 354 to minimum 356. Thus, by increasing the difference between the maximum fuel injector holding current 358 and the minimum fuel injector holding current 360 as indicated by arrow 372, the fuel injector holding current may reach the minimum fuel injector holding current at time t22, which is later in time than time t21.

The maximum fuel injector holding currents for when the fuel injector is commanded to cease injecting fuel at time t23 (the fourth plot from the top of FIG. 3) is adjusted to a level that is higher than the maximum fuel injector holding current when the fuel injector is commanded to cease fuel injection at time t22 (358 as shown in the third plot from the top of FIG. 3) and less than the maximum fuel injector holding current according to the prior art method (350 as shown in the first plot from the top of FIG. 3). By adjusting the maximum fuel injector holding current level, an amount of time it takes fuel injector holding current to be reduced from the level of maximum fuel injector holding current level 362 to the minimum fuel injector holding current level 364 may be increased as compared to the amount of time it takes to reduce the fuel injector holding current from maximum 358 to minimum 360. Thus, by increasing the difference between the maximum fuel injector holding current 362 and the minimum fuel injector holding current 364 as indicated by arrow 374, the fuel injector holding current may reach the minimum fuel injector holding current at time t23, which is later in time than time t22.

Thus, increasing the maximum fuel injector holding current may reduce the fuel injector holding current frequency and increase fuel injector holding current period. For example, when the minimum fuel injector holding current thresholds 356, 360, and 364 are equal, an increasing difference between the minimum fuel injector holding current thresholds and the maximum fuel injector holding current thresholds increases the fuel injector holding current periods. Consequently, a time that fuel injector holding current is equal to a minimum fuel injector holding current may be adjusted via adjusting the maximum fuel injector holding current threshold.

The prior art fuel injector holding current 302 is ramped up (e.g., increases at a fixed rate) from a minimum value at time t20 until it reaches a maximum fuel injector holding current 350. After the prior art fuel injector holding current 302 reaches the maximum fuel injector holding current 350, it is ramped down (e.g., decreased at a fixed rate) from the maximum value until it reaches the minimum fuel injector holding current 352. This ramping up and ramping down continues on at a fixed rate. The fixed rate may be based on the difference between the maximum fuel injector holding current 350 and the minimum fuel injector holding current 352, the temperature of the fuel injector, and battery voltage.

The prior art fuel injector holding current 302 is at a higher level at time t21 if the fuel injector is commanded to cease injecting fuel at time t21. The fuel injector closes at the time indicated at 380 when the fuel injector is commanded to cease injecting fuel at time t21. The prior art fuel injector holding current 302 is at a middle level at time t22 if the fuel injector is commanded to cease injecting fuel at time t22. The fuel injector closes at the time indicated at 381 when the fuel injector is commanded to cease injecting fuel at time t22. The prior art fuel injector holding current 302 is at a lower level at time t23 if the fuel injector is commanded to cease injecting fuel at time t23. The fuel injector closes at the time indicated at 382 when the fuel injector is commanded to cease injecting fuel at time t23. Thus, according to the prior art, the fuel injector holding current may vary depending on the time that the fuel injector is commanded to cease injecting fuel. The fuel injector may take a longer amount of time to fully close when the fuel injector is commanded to cease injecting fuel while the fuel injector holding current is a larger value as compared to if the fuel injector is commanded to cease injecting fuel while the fuel injector holding current is a smaller value as indicated at 380–t21, 381–t22, 382–t23, and 380–t21>381–t22>382–t23.

The fuel injector holding current according to the present method when the fuel injector is expected to be commanded to cease injecting fuel at time t21 (the second plot from the top of FIG. 3) is ramped up (increased at a fixed rate) from time t20 until it reaches the maximum fuel injector threshold 354. After the fuel injector holding current reaches the maximum fuel injector holding current 354, it is ramped down (decreased at a fixed rate) until it reaches the minimum fuel injection threshold 356. The fuel injector holding current 304 oscillates between the maximum fuel injector holding current threshold 354 and the minimum fuel injector holding current threshold 356 for a predetermined actual total integer number of cycles until the fuel injector is commanded to cease injecting fuel at time t21. The fuel injector holding current is equal to the minimum fuel injector holding current when the fuel injector is commanded to cease injecting fuel at time t21. The fuel injector fully closes as indicated at 385.

The fuel injector holding current according to the present method when the fuel injector is expected to be commanded to cease injecting fuel at time t22 (the third plot from the top of FIG. 3) is ramped up (increased at a fixed rate) from time t20 until it reaches the maximum fuel injector threshold 358. After the fuel injector holding current reaches the maximum fuel injector holding current 358, it is ramped down (decreased at a fixed rate) until it reaches the minimum fuel injection threshold 360. The fuel injector holding current 306 oscillates between the maximum fuel injector holding current threshold 358 and the minimum fuel injector holding current threshold 360 for a predetermined actual total integer number of cycles until the fuel injector is commanded to cease injecting fuel at time t22. The fuel injector holding current is equal to the minimum fuel injector holding current when the fuel injector is commanded to cease injecting fuel at time t22. The fuel injector fully closes as indicated at 386.

The fuel injector holding current according to the present method when the fuel injector is expected to be commanded to cease injecting fuel at time t23 (the fourth plot from the top of FIG. 3) is ramped up (increased at a fixed rate) from time t20 until it reaches the maximum fuel injector threshold 362. After the fuel injector holding current reaches the maximum fuel injector holding current 362, it is ramped down (decreased at a fixed rate) until it reaches the minimum fuel injection threshold 364. The fuel injector holding current 308 oscillates between the maximum fuel injector holding current threshold 362 and the minimum fuel injector holding current threshold 364 for a predetermined actual total integer number of cycles until the fuel injector is commanded to cease injecting fuel at time t23. The fuel injector holding current is equal to the minimum fuel injector holding current when the fuel injector is commanded to cease injecting fuel at time t23. The fuel injector fully closes as indicated at 387 and the fuel injector closing delays are 385–t21=386–t22=387–t23.

Referring now to FIG. 4, a method for operating a fuel injector is described. The method of FIG. 4 may be incorporated into the system of FIG. 1 as executable instructions stored in non-transitory memory. The method of FIG. 4 may cause the controller of FIG. 1 to receive inputs from one or more sensors described herein and adjust positions or operating states of one or more actuators described herein in the physical world. The switches, diodes, and fuel injectors mentioned in the description of FIG. 4 may be included in a circuit as described in FIG. 5.

At 402, method 400 judges whether or not the engine is running (e.g., rotating and combusting fuel). If so, the answer is yes and method 400 proceeds to 404. Otherwise, the answer is no and method 400 proceeds to 403. In one example, method 400 may judge that the engine is running if fuel is being injected to the engine and engine speed is greater than a threshold speed.

At 403, method 400 ceases current flow to the engine's fuel injectors. Fuel flow from the fuel injectors may be ceased via opening a boost high side switch, open a battery high side switch, and opening a low side switch. Method 400 proceeds to exit.

At 404, method 400 determines a minimum fuel injector holding current. In one example, method 400 retrieves the minimum fuel injector holding current from controller memory. The minimum fuel injector holding current may be stored in controller non-transitory memory during vehicle manufacturing. Method 400 proceeds to 406.

At 406, method 400 determines a most recent fuel injector holding current up slope and a most recent fuel injector holding current down slope. In one example, method 400 may determine the fuel injector holding current up slope when the battery high side switch is closed and the low side switch is closed. The fuel injector holding current up slope may be determined by monitoring fuel injector holding current and time. In particular, starting from when the fuel injector holding current is equal to the minimum fuel injector holding current threshold Imin, a period of time Tu later, the fuel injector holding current reaches the maximum fuel injector holding current Imax. The fuel injector up slope may be determined by solving the following equation for Su: Imax=Imin+SuTu=Imin+SuDtTt where Imax is the maximum fuel injector holding current, Imin is the minimum fuel injector holding current, Su is the fuel injector holding current up slope, Dt is the duty cycle of the fuel injector holding current, and Tt is the total period of the fuel injector holding current (e.g., the fuel injector holding current ramping up period plus the fuel injector holding current ramping down period).

Method 400 may determine the fuel injector holding current down slope when the battery high side switch is open and the low side switch is closed. The fuel injector holding current down slope may be determined by monitoring fuel injector holding current and time. Specifically, starting from when the fuel injector holding current is equal to the maximum fuel injector holding current threshold Imax, a period of time Td later, the fuel injector holding current reaches the minimum fuel injector holding current Imin. The fuel injector down slope may be determined by solving the following equation for Sd: Imin=Imax+SdTd=Imax+Sd(1−Dt)Tt where Imax is the maximum fuel injector holding current, Imin is the minimum fuel injector holding current, Sd is the fuel injector holding current down slope, Dt is the duty cycle of the fuel injector holding current, and Tt is the total period of the fuel injector holding current. The fuel injector holding current duty cycle may be determined via the following equations:

$$Imin = Imin + SuDtTt + Sd(1 - Dt)Tt$$

$$SuDtTt + Sd(1 - Dt)Tt = 0$$

$$SuDt + Sd(1 - Dt) = 0$$

$$Dt = \frac{Sd}{Sd - Su}$$

where the variables Imin, Su, Sd, Tt, and Dt are as previously described.

The fuel injector holding current up slope and fuel injector current down slope may be determined during a last most recent injection of fuel by the fuel injector. For example, the fuel injector holding current up slope may be determined while fuel is being injected during a first cycle of a cylinder and method 400 may retrieve the fuel injector holding current up slope value from memory during a second cycle of the cylinder that immediately follows the first cycle of the cylinder. Alternatively, the fuel injector holding current up slope and the fuel injector current down slope may be determined at the beginning of the holding current phase of the present fuel injection. Method 400 proceeds to 408.

At 408, method 400 determines a fuel injection command pulse width (e.g., a time duration of an electric signal that is supplied to a fuel injector driver circuit to open and close a fuel injector). In one example, method 400 determines a fuel pulse width according to a driver demand torque that is determined from a position of a propulsive effort pedal and engine speed. The propulsive effort pedal position and engine speed may be applied to generate a torque request. A cylinder air amount may be determined via a lookup table from the torque request. The engine fuel amount may be determined via dividing the cylinder air amount by a requested cylinder air-fuel ratio. The cylinder fuel amount may be converted into a pulse width via a function that outputs empirically determined pulse width values when it is referenced via a cylinder fuel amount. Method 400 proceeds to 410.

At 410, method 400 determines an actual total integer number of fuel injector holding current cycles are to be generated during a fuel injection event (e.g., a time when a fuel injector is open and injecting fuel). In one example, the criteria to choose the integer number of fuel injector holding current periods (e.g., time between t6 and t8 in FIG. 2) to generate may be based on maximum and minimum period lengths, which may be empirically determined via commanding a fuel injector pulse width and determining a holding current duration for the fuel injector pulse width. For example, method 400 may select an actual total number of fuel injector holding current cycles for a fuel injection event based on a maximum period (e.g., 290 micro-seconds) and a minimum period (e.g., 170 micro-seconds). Therefore, if the fuel injector holding phase duration is 856 micro-seconds, then the fuel injector holding phase current may be divided into four equally spaced saw-tooth periods. Method 400 proceeds to 412.

At 412, method 400 determines the maximum fuel injector holding current. Alternatively, method 400 may determine the fuel injector holding current duty cycle and period. In some examples, the fuel injector driver circuitry may control a duty cycle of the fuel injector holding current, or alternatively, it may turn the fuel injector on and off via the battery high side switch so that the fuel injector holding current exhibits a saw-tooth profile.

The fuel injector holding current duty cycle and period may be determined in the following way: if the commanded fuel injection pulse width (e.g., an amount of time that the fuel injector is commanded open via an electric signal) is 1512 μs (micro-seconds), and the holding phase happens to start for this injection at 656 μs with a current Imin=1.9 A. The resulting fuel injection hold phase duration is 856 μs. In this example, Su=4000 A/s and Sd=−1000 A/s. The duty cycle Dt that results in a horizontal saw-tooth profile may be computed as follows:

$$Dt = \frac{S_d}{S_d - S_u} = \frac{-1000}{-1000 - 4000} = 0.2$$

The saw-tooth period may be computed based on the integer number of periods determined at 410 as follows:

$$Tt = \frac{\text{hold phase duration}}{4} = \frac{856}{4} = 214 \text{ μs}$$

This way the fuel injector holding current is equal to Imin=1.9 A at 656 μs, 870 μs, 1084 μs, 1298 μs and 1512 μs (end of PW, OFF command). If the driver circuit directly controls the fuel injector holding current saw-tooth period and duty-cycle, a period of 214 μs (≈4.67 kHz) and a 20% duty-cycle may be commanded.

On the other hand, if the fuel injector driver circuit measures current and switches between ON (e.g., battery high side switch closed and low side switch closed) and OFF (e.g., battery high side switch open and low side switch closed) at requested Imin and Imax, then the fuel injector maximum hold current Imax may be determined. Knowing Imin=1.9 A from step 404, Imax may be computed as follows:

$$Imax=Imin+SuTu=Imin+SuDtTt$$

$$\Rightarrow Imax=1.9+4000(0.2)(214\times10^{-6})\approx2.071 \text{ A}$$

Therefore, method 400 switches fuel injector holding current at Imin=1.9 A and Imax=2.071 A.

In another example, where the commanded fuel injector pulse width is changed to 1550 µs, and the hold phase starts at 656 µs. The resulting hold phase duration is 894 µs.

$$Tt = \frac{\text{hold phase duration}}{4} = \frac{894}{4} = 223.5 \text{ µs}$$

In systems where the driver circuit directly controls fuel injector holding current saw-tooth period and duty-cycle, the fuel injector drive circuitry is commanded to provide a 223.5 µs period (≈4.47 kHz) and 20% duty-cycle.

$$Imax=Imin+SuDtTt$$

$$\Rightarrow Imax=1.9+4000(0.2)(223.5\times10^{-6})\approx2.079 \text{ A}$$

Conversely, if the driver circuit measures current and switches between ON and OFF at the requested Imin and Imax, the fuel injector holding current is switched at Imin=1.9 A and Imax=2.079 A.

Method 400 may also provide unequal fuel injector holding current saw-tooth periods. For example, if the commanded fuel injector pulse width is 1512 µs, and the hold phase happens to start for this injection at 656 µs with a current Imin=1.9 A. The resulting hold phase duration is 856 µs. The previously determined fuel injector holding currents Su=4000 A/s and Sd=−1000 A/s are also applied. The duty cycle Dt may be computed as follows resulting in a horizontal saw-tooth profile:

$$Dt = \frac{Sd}{Sd-Su} = \frac{-1000}{-1000-4000} = 0.2$$

The fuel injector holding phase current may be divided into unequal saw-tooth periods. All periods except the first can be set to a calibratable value of 200 µs, while the first period is set equal to rest of the hold phase (256 µs in this case):

$$\begin{cases} Tt1 = 256 \text{ µs} \\ Tt2 = 200 \text{ µs} \end{cases}$$

The current at 912 µs, 1112 µs, 1312 µs and 1512 µs (OFF command) is the same as the current at start (656 µs) of the hold phase (=Imin=1.9 A).

If the fuel injector driver circuitry directly controls saw-tooth period and duty-cycle, the fuel injector driver circuitry commands a first period of 256 µs with 20% duty-cycle, and remaining periods of 200 µs with 20% duty-cycle.

Conversely, if the driver circuit measures fuel injector holding current and switches between ON and OFF at requested Imin and Imax, then Imax1 and Imax2 may be determined as follows:

$$Imax1=Imin+SuDtTt1$$

$$\Rightarrow Imax1=1.9+4000(0.2)(256\times10^{-6})\approx2.105 \text{ A}$$

$$Imax2=Imin+SuDtTt2$$

$$\Rightarrow Imax2=1.9+4000(0.2)(200\times10^{-6})\approx2.060 \text{ A}$$

The fuel injector holding current is switched at Imin=1.9 A (all periods), Imax1=2.105 A for the first saw-tooth period, and Imax2=2.060 A for the remaining periods.

If the commanded fuel injector holding current pulse width is changed to 1550 µs. As before, set all periods except the first to 200 µs, but change the first period to 294 µs.

$$\begin{cases} Tt1 = 294 \text{ µs} \\ Tt2 = 200 \text{ µs} \end{cases}$$

Now the fuel injector holding current at 950 µs, 1150 µs, 1350 µs and 1550 µs (OFF command) is the same as the current at start of the hold phase (at 656 µs) of Imin=1.9 A.

If the fuel injector driver circuit directly controls saw-tooth period and duty-cycle, the fuel injector holding current may be command to a first period of 294 µs with 20% duty-cycle, and remaining periods of 200 µs with 20% duty-cycle.

If the fuel injector driver circuit measures current and switches between ON & OFF at target Imin and Imax, then Imax1 and Imax2 may be computed as follows:

$$Imax1=Imin+SuDtTt1$$

$$\Rightarrow Imax1=1.9+4000(0.2)(294\times10^{-6})\approx2.135 \text{ A}$$

$$Imax2=Imin+SuDtTt2$$

$$\Rightarrow Imax2=1.9+4000(0.2)(200\times10^{-6})\approx2.060 \text{ A}$$

The fuel injector holding current is switched at Imin=1.9 A (all periods), Imax1=2.135 A for the first saw-tooth period, and Imax2=2.060 A for the remaining periods.

NOTE: The method described here can be extended to include additional feedback correction. Say we started at Imin=1.9 A, commanded a 20% duty-cycle, but on the second cycle we got a slightly smaller Imin=1.89 A (due errors in the slope values, approximation errors . . . ). We can command a slightly higher duty-cycle (e.g. 20.5%) for the next cycle to correct. Similarly, if the driver circuit switches at target Imin and Imax, but the target Imax resulted in a slightly longer period than desired, we can slightly reduce the target Imax for the next period. Method 400 proceeds to 414 after determining the maximum fuel injector holding current. Alternatively, method 400 proceeds to 414 after determining the fuel injector holding current duty cycle and period.

At 414, method 400 applies a boost voltage to a selected fuel injector that is to deliver fuel to an engine cylinder during a cycle of an engine. Thus, the injection period for the selected fuel injector begins. The fuel injection period duration may be a function of a requested amount of fuel to be delivered via the selected fuel injector, and the requested amount of fuel may be a function of engine speed and a driver demand torque or power. In one example, the boost voltage is applied to the fuel injector via closing a boost high side switch while a low side switch and a battery high side switch are also closed. The boost voltage may be 65 volts and the battery voltage may be 12 volts. By applying the boost voltage to the selected fuel injector, the selected fuel injector may open at a faster rate as compare to if battery voltage were applied to the selected fuel injector. Method 400 proceeds to 416.

At 416, method 400 recirculates current in the fuel injector via opening the boost high side switch and flowing current through a freewheeling diode (as shown in FIG. 5) via opening the boost high side switch while the battery high side switch is closed and while the low side switch is closed. By recirculating current to the fuel injector, generation of large voltage spikes may be prevented. The current may be recirculated for a predetermined amount of time. Method 400 proceeds to 418.

At 418, method 400 reduces the electric current that is flowing through the selected fuel injector to the minimum hold current threshold value. In one example, method 400 may open the low side switch to reduce the amount of electric current that is flowing through the selected fuel injector to the minimum hold current. The boost high side switch may remain open and the battery high side switch may remain closed. The selected fuel injector enters a holding current phase and exits a boost phase. However, in some examples, method 400 may generate two boost phases before entering the holding current phase. Method 400 proceeds to 420.

At 420, method 400 applies battery voltage to the selected fuel injector so as to increase holding current toward the maximum holding current. The battery voltage may be applied to the selected fuel injector by closing the battery high side switch. Alternatively, method 400 adjusts the fuel injector holding current to the period and duty cycle values determined at 412. Method 400 proceeds to 422.

At 422, method 400 begins to recirculate electric current in the selected fuel injector when the selected fuel injector current reaches the fuel injector maximum holding current. Method 400 may begin recirculating current via opening the low side switch. By opening the low side switch, current may flow through the freewheeling diode. Method 400 continues to be in a recirculating mode until the electric current in the fuel injector is reduced to the minimum fuel injector holding current. Alternatively, method 400 continues to adjust the fuel injector holding current to the period and duty cycle values determined at 412. Method 400 proceeds to 424.

At 424, method 400 judges if the fuel injector holding current has been adjusted to provide the integer number of holding current cycles as determined at 410. Further, additionally or alternatively, method 400 may judge if the fuel injector holding current is at a predetermined value and/or if the present time is a time when the fuel injector is commanded to cease injecting fuel. If so, the answer is yes and method 400 proceeds to 426. Otherwise, the answer is no and method 400 returns to 420.

At 426, method 400 ceases flowing electric current to the selected fuel injector. In one example, method 400 may open the battery high side switch, the low side switch, and the boost high side switch to cease electric current flow to the selected fuel injector. The fuel injection period may be shorter in duration than an engine cycle. Method 400 proceeds to exit.

In this way, an amount of holding current flowing through a selected fuel injector may be adjusted. The adjustments to the selected fuel injector's holding current may reduce variation in fuel injector closing time, which may reduce variation in an amount of fuel that is injected by the selected fuel injector. The method of FIG. 4 may be applied to each of the engine's fuel injectors.

The method of FIG. 4 provides for a method for operating a fuel injector, comprising: adjusting a holding current of a fuel injector via a controller to vary in time and end at a predetermined value at a time when the fuel injector is commanded to cease flowing fuel. The method further comprises adjusting a maximum holding current of the fuel injector so that the holding current is at the predetermined value at the time when the fuel injector is commanded to cease flowing fuel. The method further comprises adjusting a period and a duty cycle of the holding current such that the holding current is at the predetermined value at the time when the fuel injector is commanded to cease flowing fuel. The method includes where the predetermined value is a minimum holding current. The method includes where the fuel injector is commanded to cease flowing fuel based on engine speed and engine load. The method includes where the holding current is adjusted via opening and closing a first switch and a second switch. The method includes where the first switch is a battery high side switch and where the second switch is a low side switch. The method includes where the battery high side switch is closed and the low side switch is closed to increase the holding current. The method includes where the battery high side switch is opened and the low side switch is closed to decrease the holding current.

Referring now to FIG. 5, an example electrical circuit 500 for operating a fuel injector is shown. A similar electrical circuit 500 may be provided for each fuel injector and the electrical circuit of FIG. 5 may be included in the system of FIG. 1, in controller 12 for example.

Circuit 500 includes a boosted power supply 502 that outputs a first voltage (e.g., 65 volts—a boosted voltage) and a battery 504 that outputs battery voltage (e.g., 12 volts). The boosted voltage may be selectively electrically coupled to fuel injector coil 512 to activate the fuel injector and begin fuel delivery from the fuel injector to an engine. The boosted voltage may be applied to the fuel injector coil 512 via boost high side switch 506. Boost high side switch 506 may be a transistor such as a field effect transistor, bipolar transistor, or other known transistor. Boost high side switch 506 may be closed to apply the boosted voltage to the fuel injector coil 512.

The battery voltage may also be selectively electrically coupled to fuel injector coil 512 to hold open the fuel injector and continue fuel delivery from the fuel injector to an engine. The battery voltage may be applied to the fuel injector coil 512 via battery high side switch 508. Battery high side switch 508 may be a transistor such as a field effect transistor, bipolar transistor, or other known transistor. Battery high side switch 508 may be closed to apply the battery voltage to the fuel injector coil 512. Switches 506 and 508 may referred to high side switches since they are located closer to the higher potential sides of battery 504 and boosted power supply 502.

Circuit 500 also includes a freewheel diode 510 that allows electrical current to flow through the freewheel diode and to fuel injector coil when current flow from the boosted high side switch or from the battery high side switch to the fuel injector coil 516 is interrupted. Circuit 500 also includes a Zener diode 516 that includes a threshold breakdown voltage (e.g., 65 volts). Finally, circuit 500 includes a low side switch 514 that may be closed to activate the fuel injector and opened to deactivate the fuel injector.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A system, comprising:
a fuel injector; and
a controller including executable instructions stored in non-transitory memory that cause the controller to adjust a maximum fuel injector holding current to a value such that a holding current of the fuel injector is a predetermined value at a time when the fuel injector is commanded to cease delivering fuel, where the holding current is adjusted at a frequency.

2. The system of claim 1, where the value is a minimum holding current threshold value.

3. The system of claim 1, where the value is based on a value of an up-slope of the holding current.

4. The system of claim 3, where the value is further based on a down-slope of the holding current.

5. The system of claim 4, where the value is further based on a minimum fuel injector holding current.

6. The system of claim 5, where the fuel injector is commanded to cease delivering fuel based on a requested fuel pulse width, and where the requested fuel pulse width is based on engine speed and load.

7. The system of claim 1, further comprising additional instructions to adjust the holding current of the fuel injector to cycle for a predetermined integer number of times during a single fuel injection.

8. A method for operating a fuel injector, comprising:
adjusting a holding current of the fuel injector via a controller to vary in time and end at a predetermined value at a time when the fuel injector is commanded to cease flowing fuel.

9. The method of claim 8, further comprising adjusting a maximum holding current of the fuel injector so that the holding current is at the predetermined value at the time when the fuel injector is commanded to cease flowing fuel.

10. The method of claim 8, further comprising adjusting a period and a duty cycle of the holding current such that the holding current is at the predetermined value at the time when the fuel injector is commanded to cease flowing fuel.

11. The method of claim 8, where the predetermined value is a minimum holding current.

12. The method of claim 8, where the fuel injector is commanded to cease flowing fuel based on engine speed and engine load.

13. The method of claim 8, where the holding current is adjusted via opening and closing a first switch and a second switch.

14. The method of claim 13, where the first switch is a battery high side switch and where the second switch is a low side switch.

15. The method of claim 14, where the battery high side switch is closed and the low side switch is closed to increase the holding current.

16. The method of claim 15, where the battery high side switch is opened and the low side switch is closed to decrease the holding current.

17. A system, comprising:
a fuel injector;
a battery high side switch and a low side switch; and
a controller including executable instructions stored in non-transitory memory that cause the controller to adjust a holding current of the fuel injector to vary in time and end at a predetermined value at a time when the fuel injector is commanded to cease flowing fuel.

18. The system of claim 17, where the holding current ends and fuel injection is commanded to cease flowing fuel via opening the low side switch and opening the battery high side switch.

19. The system of claim 17, further comprising additional instructions to adjust the holding current in response to a maximum holding current threshold that is based on an upward slope of the holding current and a downward slope of the holding current.

20. The system of claim 14, further comprising additional instructions to adjust the holding current in response to a period and a duty cycle.

\* \* \* \* \*